A. G. B. VERA.
VIGNETTER.
APPLICATION FILED MAY 8, 1918.
1,282,331.   Patented Oct. 22, 1918.
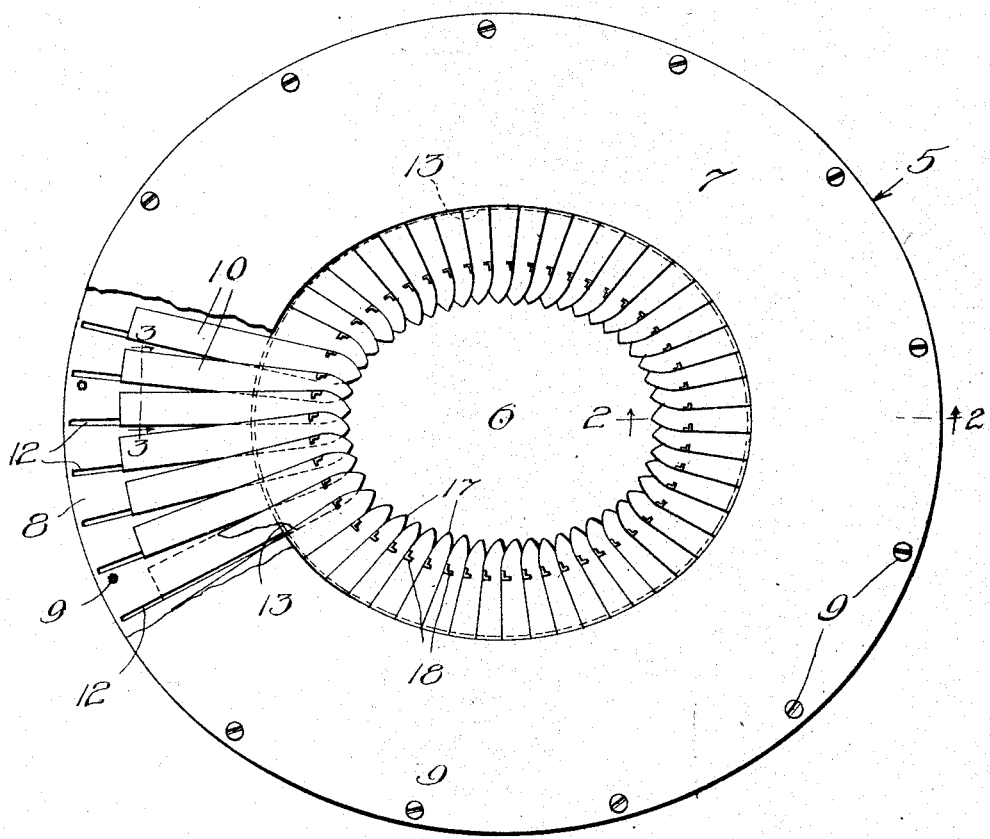
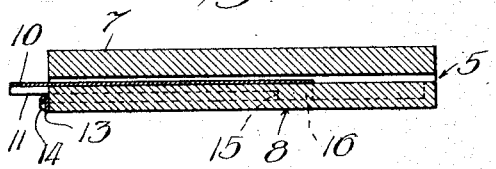
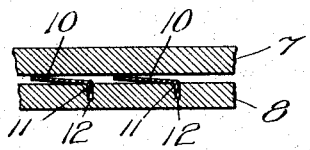
Witness:
Harry S. Gaither
Inventor
Alfonzo G. B. Vera
by Charles O. Shurvey
Attys

UNITED STATES PATENT OFFICE.

ALFONSO G. B. VERA, OF CHICAGO, ILLINOIS, ASSIGNOR OF ONE-HALF TO CHARLES KEMLER, OF CHICAGO, ILLINOIS.

VIGNETTER.

1,282,331. Specification of Letters Patent. Patented Oct. 22, 1918.

Application filed May 8, 1918. Serial No. 233,254.

*To all whom it may concern:*

Be it known that I, ALFONSO G. B. VERA, a citizen of the Republic of Mexico, and a resident of Chicago, Cook county, Illinois, have invented certain new and useful Improvements in Vignetters, of which the following is declared to be a full, clear, and exact description.

This invention relates to vignetters, and its principal object is to provide a vignetter with adjustably and slidably held blades, which may be readily manipulated to produce an exposure opening of any suitable and desirable shape. For instance, it may be found desirable to make the exposure opening conform, generally, to an irregular line, as for instance, in the case of a photograph of a person wearing a broad rimmed hat, or to make the exposure opening conform generally to the outline of the head, neck and shoulders of a person, and this present vignetter has been devised to meet all of such requirements. With these and other objects in view, this invention consists in the several novel features hereinafter fully described and claimed.

The invention is clearly illustrated in the accompanying drawing in which:

Figure 1, is a plan of a vignetter embodying a simple form of the present invention, with a part of one of the frame members broken away to show parts therebelow; Fig. 2, is a detail cross section taken on line 2—2 of Fig. 1; Fig. 3, is a detail cross section taken on line 3—3 of Fig. 1, and Fig. 4, is a perspective view of one of the slidable blades by which the size and shape of the exposure opening may be made.

Referring to said drawing, the reference character 5, designates a frame which has an opening through which the exposure is made. Said frame may be of any suitable or desirable shape, and for convenience I have illustrated it in elliptical or oval form, since this form is well adapted for printing photographs of persons.

The frame is preferably made of two companion frame members 7, 8, secured together as by screws 9. Slidably secured between said frame members are a plurality of blades 10, which extend radially from the middle of the frame, and are adapted to be moved lengthwise of themselves in the frame to produce any desired shape of exposure opening between their inner ends. In the form of the invention illustrated in the drawing, each blade is guided in the frame to permit lengthwise movement thereof, and it is here shown as comprising a flat strip of thin sheet opaque or opalescent material having a downturned edge portion 11, along one longitudinal edge, which enters a groove 12, in the member 8, of the frame. The grooves 12, converge toward each other and are arranged to extend in radial directions from the middle portion of the frame opening 6. The grooves may terminate at points adjacent the outer edge of the frame member 8, to limit the outward movement of the blades.

Preferably a stop is provided for limiting the inward movement of the blades and said stop is here shown as comprising a ring or band 13, fastened to the inner edge of the frame member 8, as by screws 14. The downturned edge portion 11, of each blade terminates in a shoulder 15, at its outer end, which shoulder may be formed by making the edge portion 11, a trifle wider at the end, as shown at 16. Preferably, the inner ends of the blades are pointed or rounded off to a point as shown at 17, to obtain a more uniform blend or shading off in vignetting a photographic print. For convenience, a tongue may be formed upon one side of each blade near its inner end which tongue may be bent up as at 18, to provide a finger hold for manipulating the blades.

The blades are made narrow as compared with their length and overlap each other within the opening 6, formed in the frame to prevent light from passing between the blades, and striking the photographic print at any place except through the exposure opening defined by the pointed ends of the blades.

From the above description it is obvious that each blade may be adjusted lengthwise of itself in this frame to bring its inner end at any desired position in the center opening of the frame, and that all of said blades may be manipulated so as to produce any desired shape of exposure opening through which to print the photograph.

After the blades have been adjusted to form the desired exposure opening, the vignetter is used in the customary manner, well known to those skilled in the art to which this invention pertains.

More or less variation of the exact details of construction is possible without departing from the spirit of this invention; I desire, therefore, not to limit myself to the exact form of the construction shown and described, but intend, in the following claims, to point out all of the invention disclosed herein.

I claim as new and desire to secure by Letters Patent:

1. A vignetter having an exposure opening defined by a plurality of independently movable, narrow, radially extending blades, overlapping each other along their side edges.

2. A vignetter comprising a frame having an exposure opening, and plurality of narrow blades, grouped around said opening and adjustably mounted to move toward and away from the middle of said opening in lines lengthwise of themselves.

3. A vignetter comprising a frame having an exposure opening, and a plurality of overlapping blades grouped around said opening and slidably mounted on said frame to move toward and away from the middle of said opening in lines lengthwise of themselves.

4. A vignetter comprising a frame having an exposure opening and consisting of two companion frame members secured together, and a plurality of narrow, radially disposed blades overlapping each other along their side edges and slidably mounted between said frame members to move in lines lengthwise of themselves.

5. A vignetter comprising a frame having an exposure opening and consisting of two companion frame members secured together, and a plurality of narrow, overlapping blades grouped around said opening and slidably mounted between said frame members to move in lines lengthwise of themselves toward and away from the middle of said opening, and stops for limiting lengthwise movement of said blades in either direction.

6. A vignetter comprising a frame member formed with a central opening, and having radially extending grooves and a plurality of blades movable toward and away from the middle of said opening having downturned, lengthwise extending edge portions entering said grooves, and means for slidably securing said blades upon said frame member.

7. A vignetter comprising an oval frame member, formed with a central opening and having radially extending grooves, a plurality of blades movable toward and away from the middle of said opening having downturned, lengthwise extending edge portions entering said grooves, each terminating in a shouldered portion, stops at each end of the grooves, limiting the lengthwise movement of said blades, and means for slidably securing said blades upon said frame member.

8. A vignetter comprising a frame having a central opening, a plurality of overlapping blades movable toward and away from the middle of said opening guided in said frame to move lengthwise of themselves, and tongues on said blades, forming finger holds whereby said blades may be manipulated.

ALFONSO G. B. VERA.

Copies of this patent may be obtained for five cents each, by addressing the "Commissioner of Patents, Washington, D. C."